(No Model.)
R. BROWNSON.
FLY NET FOR HORSES.
No. 321,884.        Patented July 7, 1885.
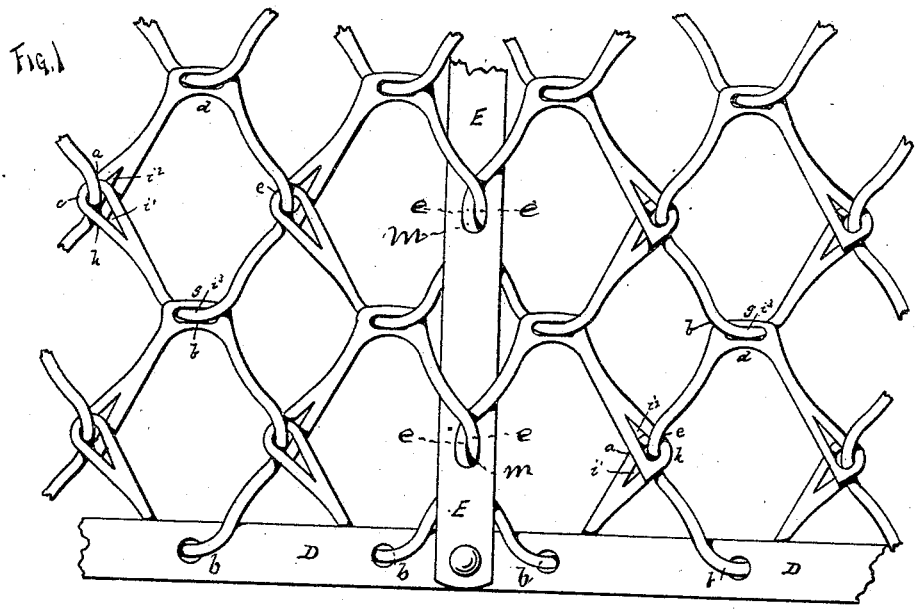
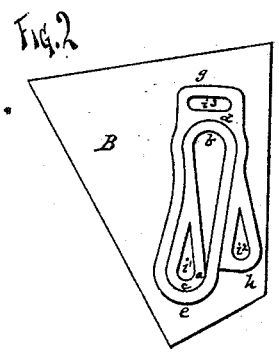
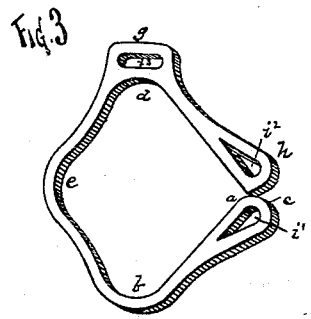
WITNESSES.
C. N. Woodward
H. S. Webster.
Ralph Brownson,
INVENTOR, BY
Louis Tessier & Co.
Atty's.

UNITED STATES PATENT OFFICE.

RALPH BROWNSON, OF ST. PAUL, MINNESOTA, ASSIGNOR OF ONE-HALF TO PETER R. L. HARDENBERGH, OF SAME PLACE.

FLY-NET FOR HORSES.

SPECIFICATION forming part of Letters Patent No. 321,884, dated July 7, 1885.

Application filed November 25, 1884. (No model.)

*To all whom it may concern:*

Be it known that I, RALPH BROWNSON, a citizen of the United States, and a resident of St. Paul, in the county of Ramsey, in the State of Minnesota, have invented certain new and useful Improvements in Fly-Nets for Horses, of which the following specification is a full, clear, and exact description, reference being also had to the accompanying drawings, in which—

Figure 1 is a view of a section of a net. Fig. 2 is a view of one of the links as it appears after being cut and before its removal from the surrounding leather. Fig. 3 is a perspective view of one of the links detached and opened out.

This invention consists in a series of separate links cut in a peculiar manner from small pieces of otherwise useless leather, and then connected together to form a web or net for horses and other animals. Each of the "links" is cut at one blow by a knife or implement formed with a blade or series of blades fastened in a head-block and adapted to cut through the leather, as shown in Fig. 2. The cutter may be formed of a single strip of thin steel, sharp on its lower edge, and with its upper edge fitting into a groove in a head-block. The blade commences at a point, $a$, and runs up and is bent around at $b$, and thence back to the point $a$, and thence around at $c$, and up again and around at the point $d$, and thence down around again at $e$, and thence up and around at $g$, (the space between $g$ and $d$ being wider than the space between the points $a$ and $e$,) and thence down again to a point, $h$, and thence inward against that part of the blade between the points $d$ and $e$. Three smaller cutters or punches will be set in the head-block to cut out the small parts $i'$ $i^2$ $i^3$.

In Fig. 2 one of the links is shown cut from a small scrap, B, of leather. After being cut out, the link will be opened out, as shown in Fig. 3, the two ends $a$ $h$ being brought together at the right and the curved part $e$ being at the left, the slot $i^3$ being at the top, while the curved part $b$ will be at the bottom. By this means all the turns of the links are large curves, so that the links are of equal strength in all parts. A sufficient number of these links being cut, the parts $b$ of one set are passed through the slots $i^3$ of the contiguous set, while the parts $e$ of one set are passed through the holes $i'$ $i^2$ of the ends $a$ $h$ of the adjoining set. By this means a web may be formed of any desired size, as shown in Fig. 1. At one end of the net the parts $b$ are passed through suitable holes in a strap, D, while a similar strap will be passed through the slots $i^3$ of the end links at the other end of the net, the straps thus forming bindings or supports to the ends of the net. A center strap, E, is also arranged as shown in Fig. 1, the links on one side being merely reversed in position, so that the parts $e$ of the rows of links next to the center-strap may be passed through holes $m$ in the strap. To each link in the last row on the sides the usual strings are attached, to hang down below the horse. Thus a complete net will be formed from scraps of otherwise useless leather, except the straps D E.

Having described my invention and set forth its merits, what I claim is—

1. A link for forming a fly-net web, cut from leather in a single piece, with curved and doubled parts $b$ $d$ $e$, and with parts $c$ $h$ $g$, respectively provided with slots $i'$ $i^2$ $i^3$, substantially as herein shown and described.

2. As an improved article of manufacture, a fly-net for horses having its web formed of links cut from leather in single pieces, each with curved parts $b$ $d$ $e$ and slotted parts $c$ $h$ $g$, substantially as shown and described, the said links being interwoven, substantially as herein shown and specified.

In testimony whereof I have hereunto set my hand in presence of two subscribing witnesses.

RALPH BROWNSON.

Witnesses:
LOUIS FEESER, Sr.,
H. O. RUTHERFORD.